US010056803B2

(12) United States Patent
Ha

(10) Patent No.: US 10,056,803 B2
(45) Date of Patent: Aug. 21, 2018

(54) MANUFACTURING METHOD OF HUB FOR FLYWHEEL

(71) Applicant: INDUSTRY-UNIVERSITY COOPERATION FOUNDATION HANYANG UNIVERSITY ERICA CAMPUS, Ansan-si, Gyeonggi-do (KR)

(72) Inventor: Sung Kyu Ha, Ansan-si (KR)

(73) Assignee: INDUSTRY-UNIVERSITY COOPERATION FOUNDATION HANYANG UNIVERSITY (KR)

( * ) Notice: Subject to any disclaimer, the term of this patent is extended or adjusted under 35 U.S.C. 154(b) by 153 days.

(21) Appl. No.: 15/153,732

(22) Filed: May 12, 2016

(65) Prior Publication Data

US 2016/0329776 A1 Nov. 10, 2016

Related U.S. Application Data

(62) Division of application No. 13/877,158, filed as application No. PCT/KR2011/000158 on Jan. 11, 2011, now abandoned.

(30) Foreign Application Priority Data

Jan. 10, 2010 (KR) ........................ 10-2010-0095756

(51) Int. Cl.
*H02K 7/02* (2006.01)
*H02J 15/00* (2006.01)
(Continued)

(52) U.S. Cl.
CPC ........... *H02K 7/025* (2013.01); *B65H 18/023* (2013.01); *F03G 3/08* (2013.01); *H02J 15/00* (2013.01);
(Continued)

(58) Field of Classification Search
CPC . H02J 15/00; H02K 7/025; F03G 3/08; F03G 2730/07; Y10T 74/2119; B65H 18/023; Y02P 90/50
See application file for complete search history.

(56) References Cited

U.S. PATENT DOCUMENTS 4,179,951 A 12/1979 Theyse
4,603,555 A * 8/1986 Mayer .................. F16F 15/315 192/112
(Continued)

FOREIGN PATENT DOCUMENTS

EP 0066040 A1 12/1982
JP 09267402 10/1997
(Continued)

*Primary Examiner* — Vishal I Patel
(74) *Attorney, Agent, or Firm* — Renaissance IP Law Group LLP

(57) ABSTRACT

There are provided a hub for a flywheel and an energy storage flywheel. The hub for a flywheel is provided between a rotor and a rotational shaft of a flywheel to allow the rotor to have the same rotation speed as that of the rotational shaft. The hub includes a hollow main dome in which a through hole into which the rotational shaft is inserted is formed in one end and an opening is formed in the other end in a longitudinal direction of the rotational shaft, and that is formed by winding a composite material therearound; and a sub dome that is bonded to the rotor and is formed by winding the composite material around an outer surface of the main dome. Any one of the main dome and the sub dome expands in a radial direction of the rotational shaft along with the rotation of the rotational shaft and the rotor to allow the sub dome and the rotor to be maintained at a bonded state therebetween.

3 Claims, 9 Drawing Sheets

301
(a)
WINDING
(b)
HARDENING
302
303
(c)
CUTTING
300

(51) Int. Cl.
*F03G 3/08* (2006.01)
*B65H 18/02* (2006.01)

(52) U.S. Cl.
CPC .......... *F03G 2730/07* (2013.01); *Y02P 90/50* (2015.11); *Y10T 74/2119* (2015.01)

(56) References Cited

U.S. PATENT DOCUMENTS

| | | | | |
|---|---|---|---|---|
| 4,821,599 | A | 4/1989 | Medlicott | |
| 4,991,462 | A | 2/1991 | Breslich et al. | |
| 5,566,588 | A | 10/1996 | Bakholdin et al. | |
| 5,692,414 | A | 12/1997 | Gregoire | |
| 5,816,114 | A | 10/1998 | Gregoire et al. | |
| 5,946,979 | A | 9/1999 | Waagepetersen | |
| 2006/0053959 | A1 | 3/2006 | Park et al. | |
| 2010/0018344 | A1 | 1/2010 | Spears et al. | |
| 2010/0206126 | A1* | 8/2010 | Spears | F16F 15/305 74/572.12 |

FOREIGN PATENT DOCUMENTS

| | | |
|---|---|---|
| JP | 10508675 | 8/1998 |
| JP | 2002511560 A | 4/2002 |

* cited by examiner 300
300a
300b
300c
θ1
θ2
θ3
(a)
(b)
(c)

(a)

(b)

MANUFACTURING METHOD OF HUB FOR FLYWHEEL

TECHNICAL FIELD

The present invention relates to an energy storage flywheel, and more particularly, to a dome type hub formed by winding a composite material in multiple layers to enhance strength and stiffness of a hub for connecting a rotor and a rotational shaft of a flywheel in order to improve energy storage capacity and an energy storage flywheel using the same.

BACKGROUND ART

Since it is difficult to accurately predict the supply and demand of electric power, an energy storage device is required to effectively manage energy.

As for the supply of electric power, it is most economical to maintain a constant optimal output in a system in which heat is used to generate electrical power, such as thermal power generation and nuclear power generation. In contrast, in a system in which the forces of nature is used to generate electric power, such as hydroelectric power generation, wind power generation, and photovoltaic power generation, an output is varied by the natural environment such as seasons, whereas the demand of electric power is varied by various factors such as a power transmission accident, an operation of large-scale factory, a change of the natural environment such as a change of days and nights and a change of season.

Due to characteristics of power energy that is simultaneously supplied and consumed, it costs a large expenditure of money to cause an electric power facility to meet a maximum demand amount, and facilities and human resources necessary to control are required to cause the output to be adjusted depending on the demand.

A lifespan of the power generation facility is reduced in the output variation procedure described above, and minor mismatch between a demand amount and a supply amount causes various problems such as a decrease in quality of electric power.

In order to solve such problems, various electric power storage technologies have been developed.

Among conventional energy storage technologies, a pumped power generation technology, a compressed air storage gas turbine technology, a battery energy storage technology, a superconducting magnetic energy storage technology, and a flywheel energy storage technology have been currently used or developed.

Among systems for implementing such technologies, the flywheel energy storage system is a device that rotates a motor using dump power, stores inertial energy of an attached rotational body, and converts the inertial energy into electric energy to use when necessary.

The flywheel energy storage system has advantageous in that energy storage efficiency is high, an instantaneous charge or discharge is possible, and a lifespan of energy is increased, a decrease in performance does not occur in a low temperature, compared to an existing mechanical energy storage device and a chemical energy storage device.

Due to such features, the system has been used in various fields to the military sector from the private sector such as an auxiliary power unit of an electric vehicle, an uninterruptible power supply, a pulse power generator, and an artificial satellite.

The flywheel energy storage system includes a flywheel rotor for storing inertial energy generated when rotating, a motor for driving the flywheel rotor, a generator for generating electrical power, a controller for controlling an input and output of power, a magnetic bearing serving as a peripheral device, and a housing.

More particularly, the flywheel includes a rotor, a rotational shaft and a hub for fixing the rotor and the rotational shaft.

When the flywheel rotates, since the rotational shaft does not easily expand in a radial direction and the rotor further expands in the radial direction, the hub needs to connect them. Thus, the hub needs to easily expand when the flywheel rotates to connect the rotational shaft and the rotor, and also need to be deformed to transfer torque of the rotational shaft to the rotor.

Further, in order to increase a resonance frequency of a rotation system, that is, the flywheel, than an operation speed, the stiffness needs to increase. Rotational motion energy capable of being stored in the flywheel energy storage system is expressed by the following equation.

$$E=(1/2)I\omega^2$$

As expressed by the above equation, energy stored in the flywheel is proportional to linearly a polar moment of inertia and the square of the rotation speed.

Accordingly, it can be seen that the rotation speed other than a size of the flywheel is highly efficient to increase the stored energy.

However, since an ordinary metal conventionally used for a material of the flywheel has a low tensile stress, it is difficult to rotate at a high speed, so that it adversely affects the high-speed flywheel energy storage system.

Recently, a composite material of high strength has been rapidly developed, so that the rotation speed of the flywheel is increased up to a high speed of 1100 m/sec. Further, energy density per a unit weight and a unit volume of the flywheel is remarkably increased, so that it is possible to develop an energy storage system of a large output.

Especially, since the composite material is fatally damaged by low-strength tensile stress in a radial direction among internal stresses, multiple layers of rings made from the composite material are combined, and an inner ring of the composite material expands toward an outer ring of the composite material, so that the stress may not occur.

Unfortunately, in order to connect the rotor with the rotational shaft, the hub for connecting the rotor and the rotational shaft needs to easily expand in the radial direction, and thus it requires that the hub is designed to easily expand in the radial direction. That is, when the flywheel rotates at a high speed, the hub may be separated from the rotor, so that it is necessary to consider a concern about a firm bond between the hub and the rotor.

In general, the rotor and the hub of flywheel are required to be designed so as to set the number of resonance rotations for avoiding the number of operation rotations and to reduce the internal stress generated during the high-speed rotation.

To achieve this, there have been proposed new hubs for fixing the rotor and the rotational shaft by designers.

FIG. 1 is a cutaway perspective view of a conventional flywheel using a split dome type hub, and FIG. 2 is a cutaway perspective view illustrating the hub of FIG. 1 (see Korea Patent Laid-Open Publication No. 10-2006-0066765).

In the conventional flywheel shown in FIGS. 1 and 2, a plurality of slits 22 is formed in a hub 50 in contact with an inner surface of a rotor 10 in a shaft direction of a rotational shaft 30, and when the flywheel is rotated at a high speed, divided portions, that is, the slits 22 expand in a radial direction by a centrifugal force to allow the hub to apply a compressive force to the inner surface of the rotor, so that it is possible to reduce tensile stress generated in the radial direction of the rotor 10 during the high-speed rotation, and it is possible to prevent the rotor 10 and the hub 50 from being separated from each other. Further, the hub 50 are fixed to the rotational shaft 30 in two or more portions, and thus it is possible to avoid resonance by allowing a resonance frequency of the flywheel t be higher than the operation speed thereof.

Disadvantageously, in the conventional split dome type hub, split-wing portions, that is, portions divided by the slits are moved in the radial direction by the centrifugal force during the high-speed rotation, so that stress concentration may occur at ends of the wing portions, that is, both ends of the slits. As a result, such a stress concentration poses a problem that the hub is damaged. Further, it may be difficult to easily manufacture the hub due to a complicated shape, and it may cost way too much to manufacture.

As explained above, in order to increase the stored energy, the flywheel needs to rotate at a high speed, and the composite material is appropriate to reduce the tensile stress and increase the strength. For this reason, the rotor formed by winding the composite material in multiple layers is used.

However, the rotor formed in the multi-layered composite material has a weakness that the rotor has high strength in a circumference direction but has low strength in the radial direction. That is, during the high-speed rotation, the wound composite material may be tore in the radial direction. Thus, a gap may be generated between the hub and the rotor, or the hub may be separated and deviated from the rotor.

In order to prevent the rotor and the hub from being separated, the hub also needs to expand in the radial direction. In this way, it is possible to prevent the rotor and the hub from being separated from each other.

The hub needs to expand in not only the radial direction. Besides, the hub needs to have enough strength so as not to be damaged during the high-speed rotation and the hub also needs to have a structure or a shape capable of increasing the resonance frequency of the flywheel.

DISCLOSURE

Technical Problem

The present invention provides a hub for a flywheel and an energy storage flywheel having the same, capable of being easily manufactured and preventing the hub from being damaged due to stress concentration, since the hub is of a lightweight and high strength and easily expands due to the high-speed rotation by forming a dome-shaped hub by winding a composite material in multiple layers.

The present invention provides a hub for a flywheel and an energy storage flywheel having the same, formed in a shape and made from a material capable of firmly maintaining a bonded state between the rotor and the hub by following the deformation of the rotor during the high-speed rotation of the flywheel, and adjusting the stiffness thereof.

Technical Solution

In order to solve the problems, in accordance with an embodiment of the present invention, there is provided a hub for a flywheel that is provided between a rotor and a rotational shaft of a flywheel to allow the rotor to have the same rotation speed as that of the rotational shaft. The hub includes a hollow main dome in which a through hole into which the rotational shaft is inserted is formed in one end and an opening is formed in the other end in a longitudinal direction of the rotational shaft, and that is formed by winding a composite material therearound; and a sub dome that is bonded to the rotor and is formed by winding the composite material around an outer surface of the main dome. Any one of the main dome and the sub dome may expand in a radial direction of the rotational shaft along with the rotation of the rotational shaft and the rotor to allow the sub dome and the rotor to be maintained at a bonded state therebetween.

The sub dome may include a first sub dome wound around the outer surface of the main dome and a second sub dome wound around an outer surface of the first sub dome, and the main dome, the first sub dome and the second sub dome may have different winding angles from each other.

The first sub dome may have a winding angle smaller than that of the main dome, and the second sub dome may have a winding angle smaller than that of the first sub dome.

A winding thickness of the main dome may be thinner than that of the first sub dome and may be thicker than that of the second sub dome.

The first sub dome may have a winding start position different from that of the second sub dome with respect to the outer surface of the main dome.

The winding start position of the first sub dome may be close to the through hole than the winding start position of the second sub dome.

The winding start position of the first sub dome may be located at an outer surface of a cone-shaped portion of the main dome.

A winding thickness of the main dome near the through hole may be thicker than a winding thickness of the main dome near the opening.

Meanwhile, in order to solve the problems, in accordance with an embodiment of the present invention, there is provided an energy storage flywheel including a rotor that stores rotational motion energy as inertial energy and is formed by winding a composite material in multi layers therearound; a rotational shaft that is arranged to penetrate through an inner side of a hollow portion formed in the rotor; and a hub that is provided between the hollow portion of the rotor and the rotational shaft to connect the rotational shaft and the rotor, and compensates a shape change of the rotor when the rotor is rotated. The hub may include a hollow main dome in which a through hole into which the rotational shaft is inserted is formed in one end and an opening is formed in the other end and is formed by winding the composite material therearound, and a sub dome that is bonded to the rotor and is formed by winding the composite material around an outer surface of the main dome.

The sub dome may include a first sub dome wound around the outer surface of the main dome and a second sub dome wound around an outer surface of the first sub dome, and the first sub dome may have a winding angle smaller than that of the main dome, and the second sub dome may have a winding angle smaller than that of the first sub dome.

The first sub dome may have a winding start position different from that of the second sub dome with respect to the outer surface of the main dome.

A winding start position of the first sub dome may be close to the through hole than a winding start position of the second sub dome.

The hub may be provided by at least two in multi layers in a longitudinal direction of the rotational shaft.

A bonded state between the hub and the rotor may be maintained during the rotation by winding the composite material in multiple layers therearound so as to be expandable in a radial direction of the rotational shaft.

Advantageous Effects

As described above, according to a hub for a flywheel and an energy storage flywheel having the same in accordance with the present invention, by manufacturing a dome-shaped hub by winding a composite material in multiple layers, it is possible to easily manufacture the hub, and it is possible to allow the hub to easily expand due to the rotation. Further, since the hub is light in weight and has high strength compared to metal, it is possible to prevent the hub from being damaged due to stress concentration during the high-speed rotation of the flywheel.

In addition, according to a hub for a flywheel and an energy storage flywheel having the same in accordance with the present invention, since the hub does not easily expand in a portion adjacent to a rotational shaft but easily expands in a portion adjacent to a rotor, the hub has high strength and high resonance frequency while easily connecting the rotational shaft and the rotor during the high-speed rotation of the flywheel, so that it is possible to prevent a resonance phenomenon.

Moreover, according to a hub for a flywheel and an energy storage flywheel having the same in accordance with the present invention, due to the hub obtained by winding the composite material in multiple layers, the stiffness of the hub can be adjusted so as to correspond to the rotation speed of the flywheel, and it is possible to use an inner space or a lower space of the hub since the hub has a dome shape.

According to a hub for a flywheel and an energy storage flywheel having the same in accordance with the present invention, since a plurality of hubs is manufactured through integrally winding and cutting, it is possible to maintain identity or uniformity in quality between the plurality of hubs.

MODE FOR INVENTION

Figure 1:
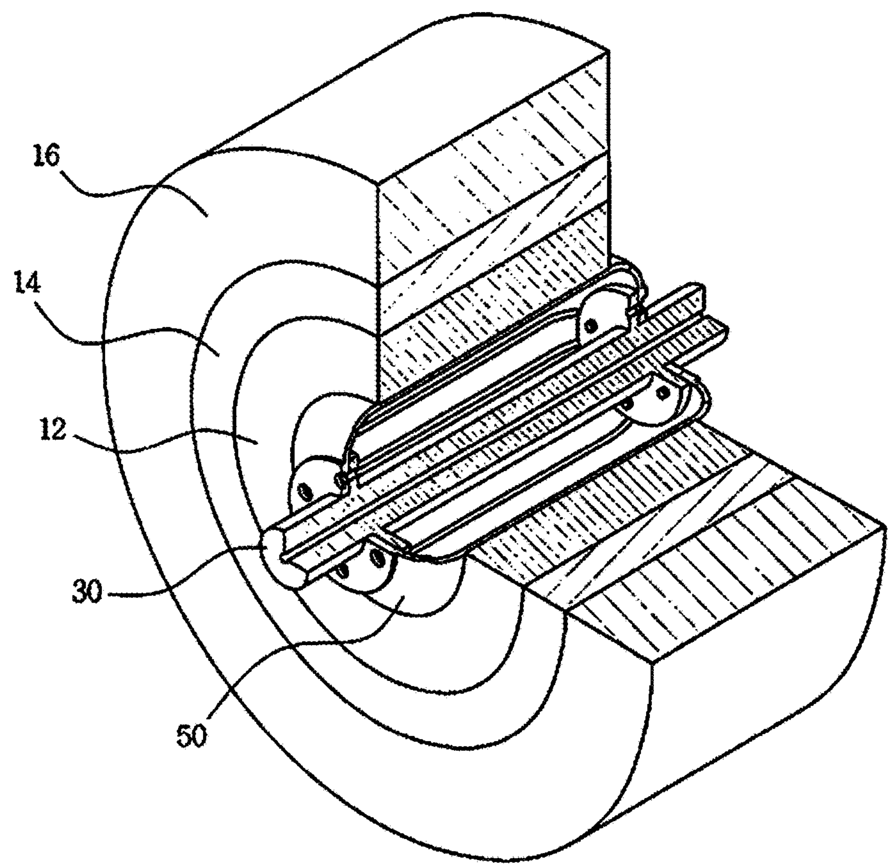
FIG. 1 is a cutaway perspective view of a conventional flywheel having a split dome type hub.
Figure 2:
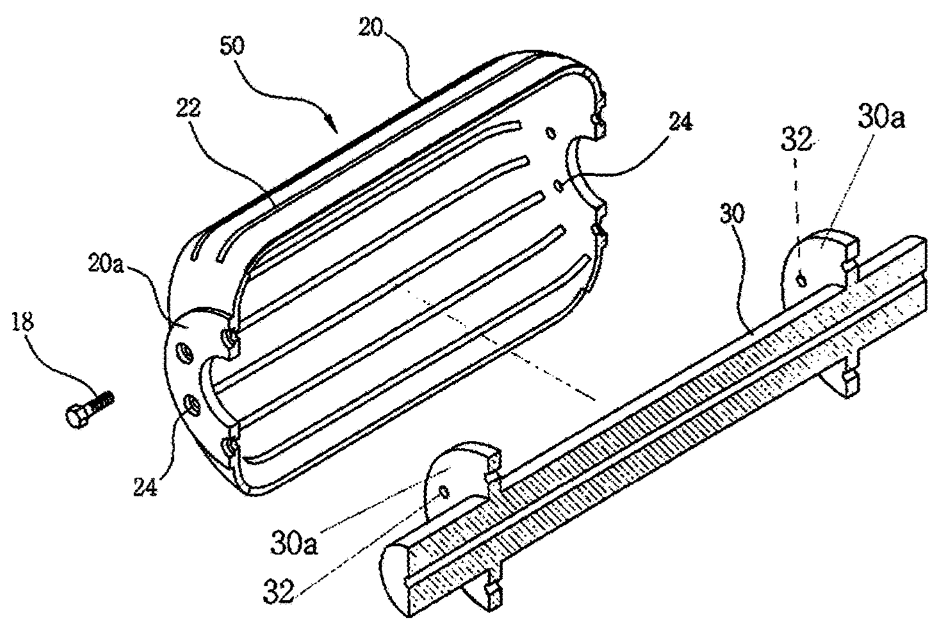
FIG. 2 is a cutaway perspective view of the hub shown in FIG. 1.

Hereinafter, embodiments of the present invention will be described in detail with reference to the accompanying drawings. However, the present invention is not limited or restricted to the embodiments. In the drawings, the same components will be assigned the same reference numerals.

Figure 3:
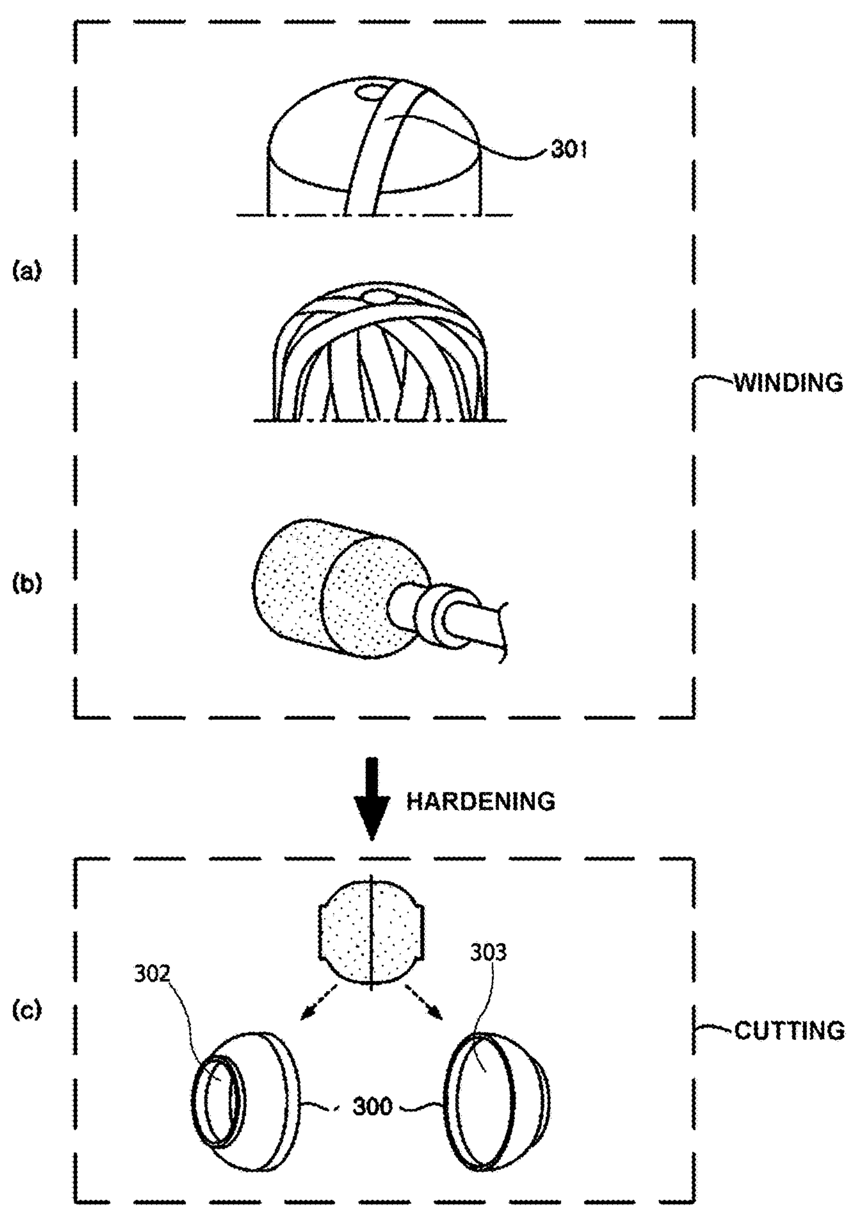
FIG. 3 shows diagrams illustrating a process of manufacturing a hub for a flywheel according to an embodiment of the present invention.

FIG. 3 shows diagrams illustrating a process of manufacturing a hub for a flywheel according to an embodiment of the present invention.

A hub for a flywheel 300 according to an embodiment of the present invention is configured to connect a rotor and a rotational shaft of a flywheel, and is manufactured by a filament winding method.

As shown in FIG. 3, the hub for a flywheel 300 according to the embodiment of the present invention is obtained by a manufacturing method including a step of winding a composite material, a step of hardening the wound composite material, a step of cutting the hardened form.

As shown in FIG. 3(*a*), in the winding step of the composite material, a composite material 301 is wound by the filament winding method to form a hollow pressure vessel shape.

The composite material 301 is a material obtained by coating a reinforcing fiber material such as a carbon fiber, a glass fiber or a fiber mixture of the carbon fiber and the glass fiber with thermosetting resin such as epoxy.

The composite material 301 described above is obtained by using various kinds of fibers in addition to the carbon fiber and the glass fiber, and may be obtained by mixing other types of fibers when necessary.

The filament winding method refers to a method in which air included in a surface of the reinforcing fiber material is substituted with the thermosetting resin, and the reinforcing fiber material is consecutively wound around a mandrel at a certain winding angle while the resin is impregnated in the reinforcing fiber material.

Such a filament winding method is classified into a dipping manner and a drum manner according to an impregnating method of resin. The dipping manner is a manner of impregnating the reinforcing fiber material with the resin in an impregnating bath filled with a resin liquid, and the drum manner is a manner of impregnating the reinforcing fiber material with the resin on a drum being rotated.

Further, the filament winding method is classified into a hoop manner and a helical manner according to a winding manner. The hoop manner is a manner in which a filament, that is, the composite material 301 is vertically wound around the mandrel, and the helical manner is a manner in which the composite material 301 is wound around the mandrel so as to form a large angle with a rotational shaft 100 of the mandrel.

In the winding step, the composite material 301 is wound by the helical manner to form both ends in a dome shape. In the winding step, the composite material 301 may be wound by the hoop manner, when necessary.

Compared with other methods of processing the composite material, the filament winding method has benefits in that the cost of the material to be used is low, the cost of labor is low, and the reproduction of the product is enhanced because uniformity in manufacturing processes is achieved when a computer control or a robot is used. Such a filament winding method is usually used in manufacturing a composite pressure vessel.

FIG. 3(*b*) illustrates a state where the winding step is completed. In the winding step, the composite material 301 is wound so as to have a different thickness for each zone, if necessary.

Meanwhile, when a dome shape of the hub 300 to be manufactured is determined, a winding angle of the composite material 301 is determined. When the winding angle of the composite material 301 is determined, the stiffness, strength, and deformation rate of the hub 300 to be manufactured are determined. Such elements may be determined through a finite element analysis or a structure analysis.

Meanwhile, the hardening step is a step of hardening the composite material 301 wound around the mandrel. As shown in FIG. 3(*c*), the cutting step is a step of cutting the both ends of the composite material 301 wound in the pressure vessel shape as shown in FIG. 3(*b*) in the dome shape. As shown FIG. 3(*c*), the hub 300 according to the embodiment of the present invention uses two dome-shaped hubs 300 obtained by symmetrically cutting the pressure vessel shaped component manufactured by the same filament winding method, and thus the uniformity between the two dome-shaped hubs 300 may be maintained. Accordingly, when the dome-shaped hubs 300 obtained through cutting is used for the flywheel, even if the hubs rotate at a high speed, it is possible to prevent any one of the hubs 300 from having an abnormal dimension or being damaged.

The hub 300 obtained by the cutting step described above has a dome shape whose an outer surface protrudes in a convex shape in one direction and an inner surface is hollow in a concave shape in one direction, and is formed by winding the composite material 301 therearound.

As described above, by forming the hub 300 in a dome shape, it is possible to prevent the hub from shaking in a vertical direction, it is possible to improve the stiffness thereof in a radial direction, and it is possible to allow the hub to easily expand in the radial direction.

Further, by manufacturing the hub 300 by the filament winding method of the composite material as described above, the hub can be easily manufactured. Further, since the hub is manufactured using the composite material, the hub having a high expansion rate and a high stiffness are obtained, so that it is possible to increase a resonance frequency thereof. If necessary, an outer diameter and an inner diameter of the dome-shaped hub 300 may be further processed or blasted.

Hereinafter, a method of manufacturing the hub for a flywheel 300 according to the embodiment of the present invention and a structure thereof will be described in detail with reference to the drawings.

Figure 4:
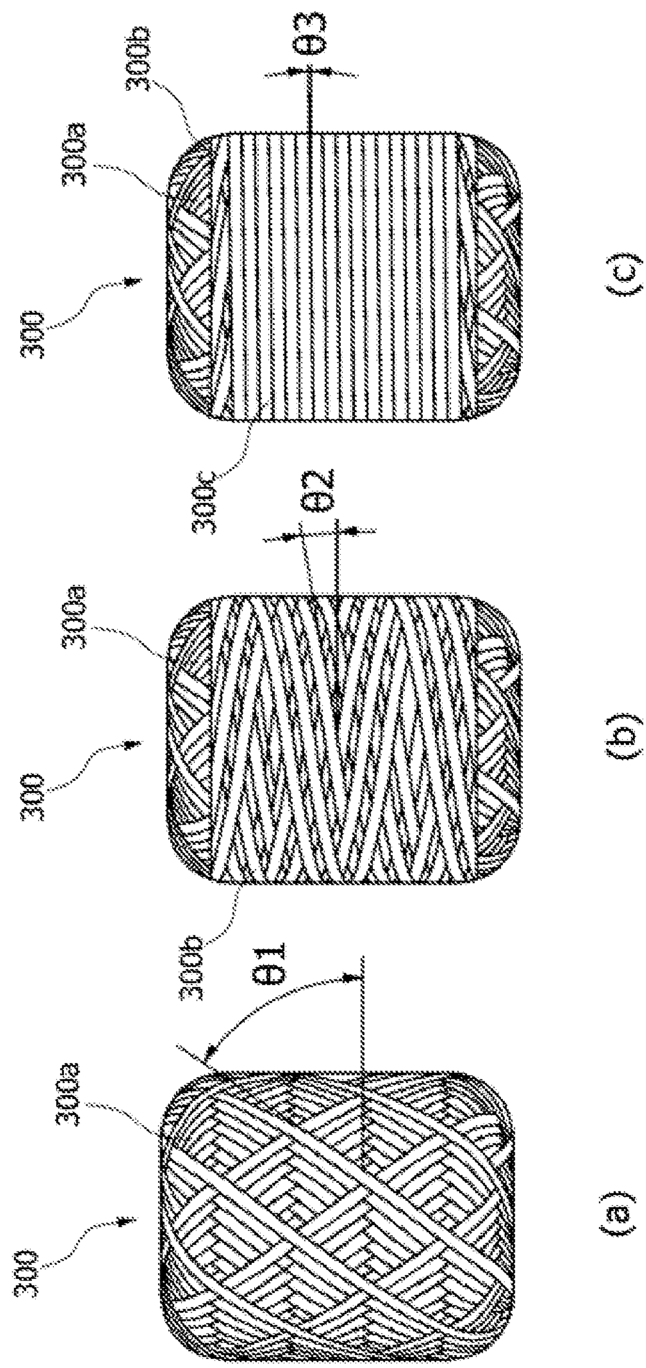
FIG. 4 shows diagrams illustrating a process of winding the hub for a flywheel according to the embodiment of the present invention.
Figure 5:
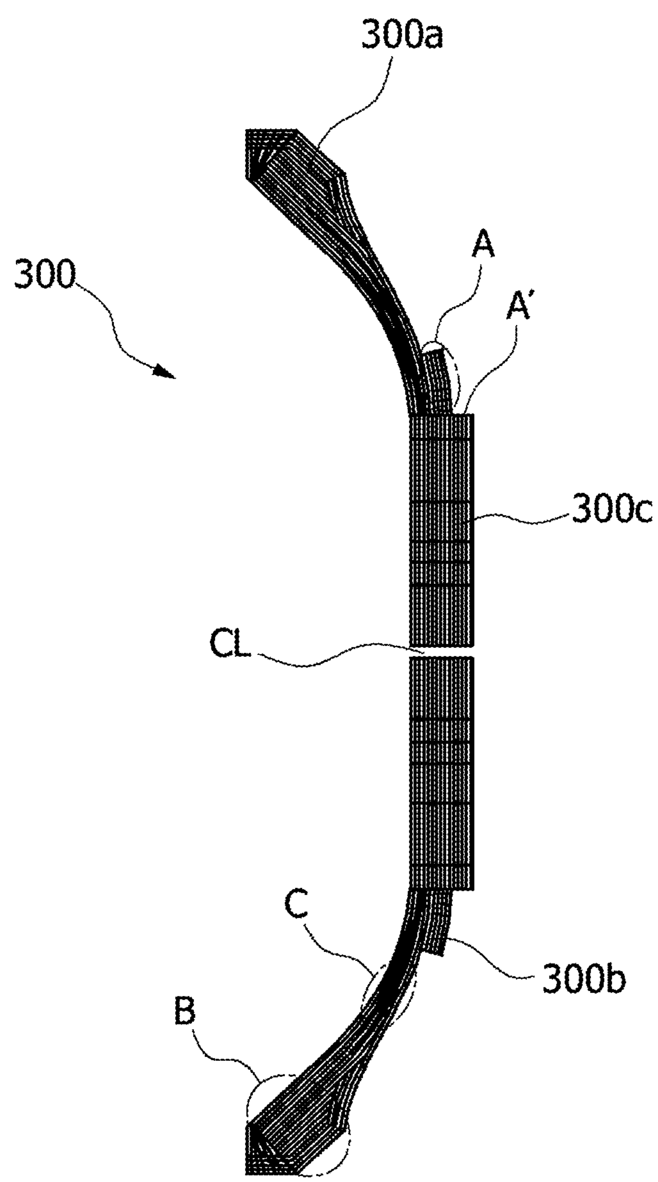
FIG. 5 is a traversal cross-sectional view of the hub for a flywheel shown in FIG. 4(*c*).

FIG. 4 is a diagram illustrating a process of winding the hub for a flywheel according to the embodiment of the present invention, and FIG. 5 is a transversal cross-sectional view of the hub for a flywheel shown in FIG. 4(*c*).

As shown in FIGS. 4 and 5, the hub for a flywheel 300 according to the embodiment of the present invention includes a hollow main dome **300*a* in which a through hole 302 into which the rotational shaft is inserted is formed in one end thereof and an opening 303 is formed in the other end thereof in a longitudinal direction of the rotational shaft and that is formed by winding the composite material 301 therearound; and sub domes 300*b* and 300*c* that are bonded to the rotor and are formed by winding the composite material 301 around an outer surface of the main dome 300*a*. Since at least one of the main dome 300*a* and the sub domes 300*b* and 300*c* expands in a radial direction of the rotational shaft along with the high-speed rotation of the rotor and the rotational shaft, the rotor and the hub 300, and the rotor and the sub domes 300*b* and 300*c*** can maintain at a bonded state therebetween.

Here, in order to enhance adhesive properties between the hub 300 and the rotor, the composite material 301 made from the same composition as or similar to that of the rotor is preferably wound around the hub 300.

Meanwhile, the sub domes **300*b* and 300*c* may include a first sub dome 300*b* wound around the outer surface of the main dome 300*a* and a second sub dome 300*c* wound around an outer surface of the first sub dome 300*b*. That is, the sub domes 300*b* and 300*c* may include at least two winding layers of the composite material. Although FIGS. 4 and 5 illustrate the hub 300 in which the sub domes 300*b* and 300*c*** include two winding layers, the present invention is not limited thereto. The sub domes may include multiple layers depending on design requirements such as necessary stiffness.

Here, the main dome **300*a*, the first sub dome 300*b*, and the second sub dome 300*c*** may have different winding angles.

To achieve this, the sub domes **300*b* and 300*c* may include the first sub dome 300*b* wound around the outer surface of the main dome 300*a* and the second sub dome 300*c* wound around the outer surface of the first sub dome 300*b*, and the main dome 300*a*, the first sub dome 300*b*, and the second sub dome 300*c* may be formed by winding the composite material therearound so as to form different winding angles to each other. As shown in FIG. 4, an angle θ1 of winding the composite material around the main dome 300*a*, an angle θ2 of winding the composite material around the first sub dome 300*b*, and an angle θ3 of winding the composite material around the second sub dome 300*c* are different to each other. In this way, by allowing the angles of winding the composite material around the main dome 300*a*, the first sub dome 300*b*, and the second sub dome 300*c* constituting the hub 300 to be different to each other, it is possible to improve the stiffness of the hub 300, and it is possible to allow the main dome 300*a*, the first sub dome 300*b* and the second sub dome 300*c* to have different expansion degrees each other in the radial direction. Thus, during the high-speed rotation of the flywheel, the rotor is deformed in the radial direction, and thus the hub 300 can also expand or be deformed in the radial direction. As a result, the rotor and the hub 300** can firmly maintain a bonded state therebetween.

Meanwhile, the winding angle θ2 of the first sub dome **300*b* may be smaller than the winding angle θ1 of the main dome 300*a*, and the winding angle θ3 of the second sub dome 300*c* may be smaller than the winding angle θ2 of the first sub dome 300*b***. In this way, by allowing the winding angle of the composite material to be wound later to be smaller than the winding angle of the composite material that has been previously wound, it is possible to prevent the previously wound-composite material from being unwound due to the high-speed rotation or from being tore in the radial direction, so that the stiffness thereof can be further improved.

In addition, a thickness of winding the composite material around the main dome **300*a* may be thinner than a thickness of winding the composite material around the first sub dome 300*b*, and be thicker than a thickness of winding the composite material around the second sub dome 300*c*. In this way, by allowing the thickness of the intermediate-side winding 300*b* to be thicker than that of the inner-side winding 300*a* and that of the outer-side winding 300*c*, the inner-side winding further expands in the radial direction to push the outer-side winding toward the rotor during the high-speed rotation, so that the hub 300** can be prevented from being separated from the rotor.

The main dome **300*a*, the first sub dome 300*b*, and the second sub dome 300*c* constituting the hub 300 may be formed such that start positions of winding the composite material therearound are different to each other. That is, the first sub dome 300***b* may be wound around the outer surface of the main dome 300*a* from the winding start position different from that of the second sub dome 300*c*.

Referring to FIG. 4, while the main dome 300*a* is formed by winding the composite material around the entire mandrel, the first sub dome 300*b* is formed by winding the composite material around a cylindrical portion of the main dome 300*a* and parts of cone-shaped portions of both ends of the cylindrical portion. Further, the second sub dome 300*c* is wound around only a cylindrical portion of the first sub dome 300*b*. Thus, three winding layers are formed on a cylindrical portion of the hub 300, whereas two winding layers or one winding layer is formed on both ends of the cylindrical portion thereof. In this way, by allowing the winding start positions of the composite material to be different to each other such that overlapped winding portions of the composite material are different to each other, it is possible to adjust the stiffness required for the hub 300. At this time, the winding start positions can be determined in a design phase through the structure analysis.

As shown in FIG. 5, a start position A of winding the composite material of the first sub dome 300*b* may be close to the through hole 302 than a start position A' of winding the composite material around the second sub dome 300*c*, and the start position A of winding the composite material of the first sub dome 300*b* is located at an outer surface of a cone-shaped portion of the main dome 300*a*.

When viewed from cutting line CL for cutting the hub 300, multiple layers are wound around a portion near the opening 303 of the hub 300. In this way, the multiple layers of the composite material are preferably wound around a portion which expands in the radial direction during the high-speed rotation.

A winding thickness B of the main dome 300*a* near the through hole 303 may be thicker than a winding thickness C thereof near the opening 303. The winding B near the through hole 302 needs to maintain a bonded state between the rotational shaft and the hub 300 even during the high-speed rotation. To achieve this, it is preferable to thickly wind so as to prevent the hub 300 from expanding even during the high-speed rotation. In contrast, it is preferable to wind around the portion of the hub 300 near the opening 303 to have a relatively thin thickness so as to easily expand during the high-speed rotation.

Meanwhile, an energy storage flywheel 10 (see FIG. 7) according to an embodiment of the present invention stores rotational motion energy as inertial energy. The energy storage flywheel 10 includes a rotor 200 (see FIG. 7) formed by winding the composite material in multiple layers; a rotational shaft 100 (see FIG. 7) arranged to penetrate through an inner side of a hollow portion formed in the rotor 200; and the hub 300 that is provided between the rotational shaft 100 and the hollow portion of the rotor 200 to connect the rotational shaft 100 and the rotor 200 and that compensates for a shape change of the rotor 200 when the rotor is rotated. The hub 300 includes the hollow main dome 300*a* in which the through hole 302 into which the rotational shaft is inserted is formed in the one end thereof and the opening 303 is formed in the other end thereof in the longitudinal direction of the rotational shaft and that is formed by winding the composite material 301 therearound; and the sub domes 300*b* and 300*c* that are bonded to the rotor and are formed by winding the composite material 301 around the outer surface of the main dome 300*a*.

Here, the hub 300 may be configured such that at least two hubs are formed in multi-layers in the longitudinal direction of the rotational shaft 100. The hub 300 is configured such that the composite material is wound in multiple layers to expend in the radial direction of the rotational shaft 100, so that a bonded state between the hub 300 and the rotor 200 can be maintained during the rotation.

Hereinafter, various shapes of the hub according to the embodiment of the present invention will be described in detail with reference to the drawings.

Figure 6:
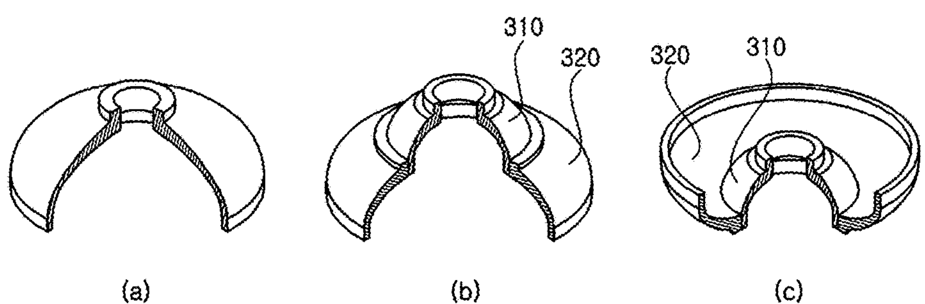
FIG. 6 is a cutaway perspective view illustrating various shapes of the hub for a flywheel according to the embodiment of the present invention.
Figure 7:
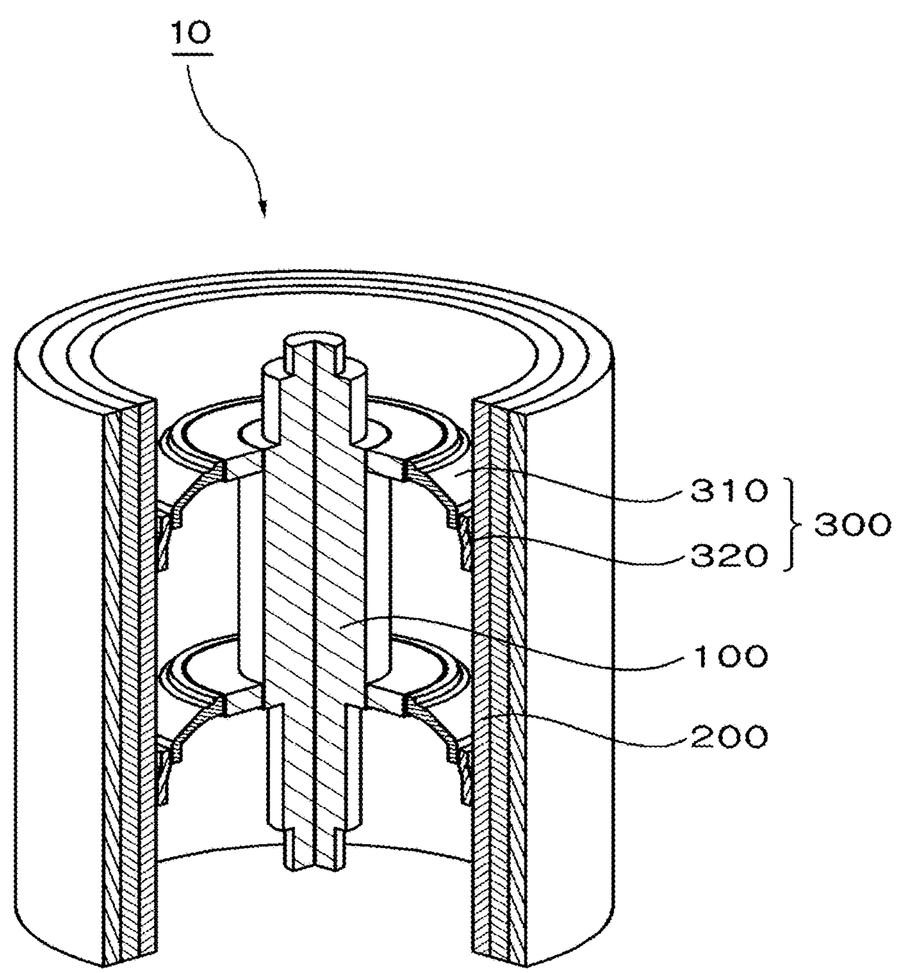
FIG. 7 is a cutaway perspective view illustrating a flywheel at which the hub for a flywheel according to the embodiment of the present invention is provided.
Figure 8:
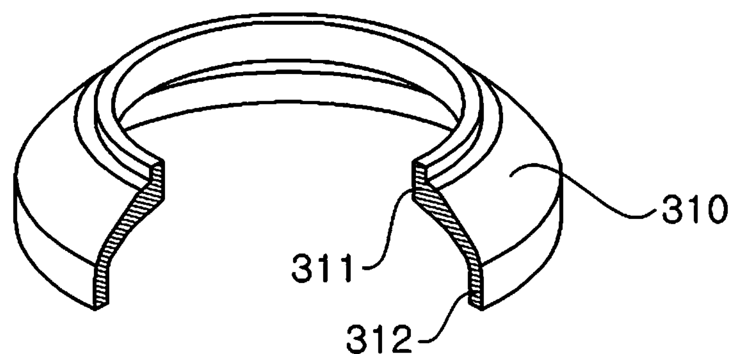
FIG. 8 is a cutaway perspective view illustrating an exploded state of the hub shown in FIG. 7.
Figure 8:
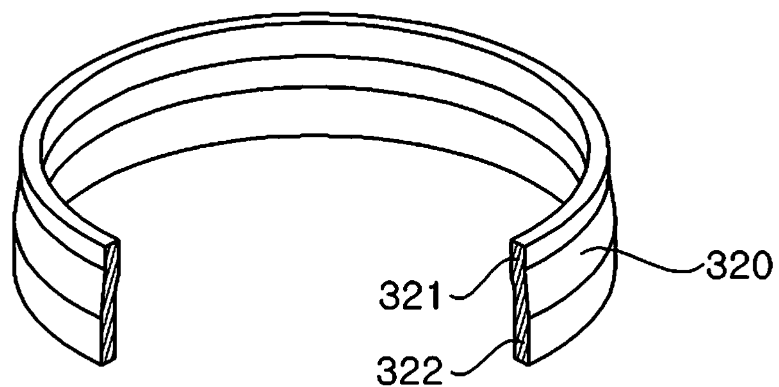
Figure 9:
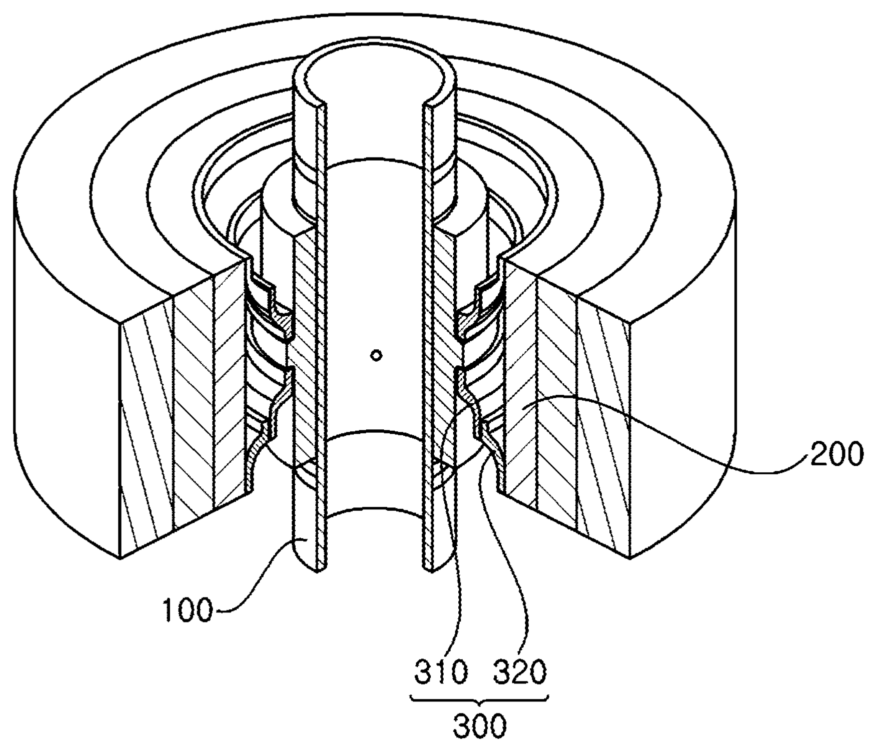
FIG. 9 is a cutaway perspective view illustrating a flywheel at which the hub for a flywheel according to the embodiment of the present invention is provided in another manner.

FIG. 6 shows cutaway perspective views of various shapes of the hub for a flywheel according to the embodiment of the present invention, FIG. 7 is a cutaway perspective view of a flywheel at which the hub for a flywheel according to the embodiment of the present invention is provided, FIG. 8 is a cutaway perspective view illustrating an n exploded state of the hub shown in FIG. 7, and FIG. 9 is a cutaway perspective view illustrating a flywheel at which the hub for a flywheel according to the embodiment of the present invention is provided in another manner.

As shown in FIG. 6, the hub for a flywheel 300 according to the embodiment of the present invention may use various shapes such as a single dome or a combination of two or more domes. That is, the hub 300 according to the embodiment of the present invention may be formed in multiple layers such as three or more layers by coupling multiple domes to each other, in addition to two layers.

Further, the stiffness of each dome can be adjusted by using various types of composite materials. When a fiber of high stiffness is used, the structural stiffness of the dome is improved, whereas the dome does not expand during the rotation. On the other hand, when a fiber of low stiffness is used, the structural stiffness of the dome is degraded, whereas the dome easily expands during the rotation. Thus, a type of the fiber used for the dome type composite hub 300 may be determined using such properties. Here, a mixed fiber of two or more fibers may be used.

As shown in FIG. 7, the hub 300 is assembled between the rotational shaft 100 and the rotor 200 constituting the flywheel 10. An outer-diameter portion having a large diameter is in contact with an inner surface of the rotor 200, and an inner-diameter portion having a small diameter is in contact with the rotational shaft 100 while surrounding the rotational shaft 100.

That is, the energy storage flywheel 10 according to the embodiment of the present invention includes the rotational shaft 100; the rotor 200 surrounding the rotational shaft 100 while being spaced apart from the rotational shaft 100; and the hub 300 arranged between the rotational shaft 100 and the rotor 200 to connect the rotational shaft 100 and the rotor 200.

As described above, the hub 300 is formed by manufacturing the composite material 301 by the filament winding method. Such a hub 300 is preferably assembled between the rotational shaft 100 and the rotor 200 in a press-fit manner. That is, an inner diameter of the hub 300 is slightly smaller than a diameter of the rotational shaft 100, and an outer diameter of the hub 300 is slightly larger than an inner diameter of the rotor 200. Then, the rotational shaft 100 and/or the hub 300 are cooled or compressed by a press to be assembled in the press-fit manner.

In other words, the hub 300 is formed to have the inner diameter slightly smaller than the diameter of the rotational shaft 100, and then the rotational shaft 100 is cooled or compressed by a press. Thereafter, the inner diameter of the hub 300 is assembled in the press-fit manner.

Subsequently, the hub 300 is formed to have the outer diameter slightly larger than the inner diameter of the rotor 200, and then the hub 300 is cooled or compressed by a press. Thereafter, the hub 300 is assembled into the inner diameter of the rotor 200 by the press-fit manner.

By assembling in the press-fit manner, even when the rotor 200 greatly expands in the radial direction during the rotation of the flywheel, the hub 300 can continuously connect the rotor 200 and the rotational shaft 100.

As shown in FIG. 6(*b*) and FIG. 6(*c*), when the hub 300 is configured such that two domes are coupled, the hub 300 includes a first hub 310 and a second hub 320, as shown in FIGS. 7 and 8.

FIG. 6(*b*) illustrates a case where the first hub 310 and the second hub 320 are coupled so as to protrude in the same direction, and FIG. 6(*c*) illustrates a case where the first hub 310 and the second hub 320 are coupled so as to protrude in an opposite direction to each other.

In FIG. 6(*c*), since the first hub 310 and the second hub 320 protrude in the opposite direction, the entire height of the hub 300 can be reduced, so that the hub 300 can be further effectively used under a spatial constraint.

A first inner-diameter portion 311 in contact with the rotational shaft 100 and a first outer-diameter portion 312 having a diameter greater than that of the first inner-diameter portion 311 are formed at the first hub 310. A second inner-diameter portion 321 surrounding the first outer-diameter portion 312 of the first hub 310 and a second outer-diameter portion 322 having a diameter greater than that of the second inner-diameter portion 321 and in contact with an inner surface of the rotor 200 are formed at the second hub 320.

When the first hub 310 and the second hub 320 are separated from each other, the diameter of the first inner-diameter portion 311 is smaller than the diameter of the rotational shaft 100, the diameter of the first outer-diameter portion 312 is greater than the diameter of the second inner-diameter portion 321, and the diameter of the second outer-diameter portion 322 is greater than the inner diameter of the rotor 200.

Due to such a difference in diameter, the hub 300 is assembled between the rotational shaft 100 and the rotor 200 in the press-fit manner, and the first outer-diameter portion 312 of the first hub 310 and the second inner-diameter portion 321 of the second hub 320 may be coupled using epoxy.

In other words, in order to prevent the rotational shaft 100 and the hub 300 from being separated from each other during the rotation, an interference amount between the rotational shaft 100 and the hub 300 is previously set, that is, the first inner-diameter portion 311 of the first hub 310 is set to be smaller than the diameter of the rotational shaft 100 to be able to assemble in the press-fit manner.

A part or all of an expansion amount generated when the hub 300 rotates is previously applied when the hub is stopped, and thus a stress applied to the hub 300 can be reduced.

Further, an extension percentage of the first inner-diameter portion 311 due to centrifugal force is equal to or less than that of the rotational shaft 100, and an extension percentage of the first outer-diameter portion 312 is greater than that of the first inner-diameter portion 311 and is equal to or greater than that of the second inner-diameter portion 321. An extension percentage of the second outer-diameter portion 322 is greater than those of the first outer-diameter portion 312 and the second inner-diameter portion 321 and is equal to or greater than that the inner surface of the rotor 200. Thus, the hub 300 can be constantly coupled to the rotational shaft 100 and the rotor 200 without being separated therefrom during the rotation of the flywheel.

If necessary, the first outer-diameter portion 312 of the first hub 310 and the second inner-diameter portion 321 of the hub 320 are made from the same composite material, so that the extension percentages thereof can be further easily adjusted.

The hub 300 may be attached by one or two or more. Two hubs 300 may be attached in the same direction as shown in FIG. 7, and the two hubs 300 may be attached in the opposite direction to each other as shown in FIG. 9 in order to secure a space.

When the hub 300 is configured to include a single dome, among the characteristics, the inner diameter of the hub 300 has the characteristic of the first inner-diameter portion 311, and the outer diameter thereof has the characteristic of the second outer-diameter portion 322. By way of example, during the rotation of the fly wheel, when a deformation rate of 1% occurs in a circumference direction at the inner surface of the rotor 200 and a deformation rate of 0.2% occurs at the rotational shaft 100, a deformation rate of the outer diameter of the hub 300 in contact with the inner surface of the rotor 200 needs to be 1% or more, and a deformation rate of the inner diameter of the hub 300 in contact with the rotational shaft 100 needs to be 0.2% or less.

In this way, the hub 300 according to the embodiment of the present invention is formed by winding the composite material 301 therearound, so that the hub can be easily manufactured. Further, the hub is light in weight and has high strength, so that a resonance frequency thereof is increased. Thus, the rotation speed causing resonance of the flywheel is greater than an actual operation speed, so that it is possible to prevent the hub 300 and the flywheel from causing the resonance.

In addition, since a portion of the hub 300 adjacent to the rotor 200 is likely to expand, the rotational shaft 100 and the rotor 200 can be easily connected during the high-speed rotation of the flywheel.

As described above, although the embodiments of the present invention have been described in connection with the particular embodiments and drawings and the particular elements such as specific components, the embodiments are merely provided to help the overall understanding, and the present invention is not limited to the above-described embodiments. It should be understood that various variations and modifications are possible by those skilled in the art from the above detailed description. Accordingly, the spirit of the present invention is limited to the above-described embodiments, in addition to the appended claims, all variations or modifications that can be deduced from equivalents interpreted from the claims fall within the scope of the present invention.

INDUSTRIAL APPLICABILITY

The present invention can be applied to an energy storage device or the like.

The invention claimed is:

1. A method of manufacturing a hub for a flywheel that is provided between a rotor and a rotational shaft of the flywheel to allow the rotor to have the same rotation speed as that of the rotational shaft, the method comprising:

forming a hollow main dome in which a through hole into which the rotational shaft is inserted is formed in one end and an opening is formed in the other end in a longitudinal direction of the rotational shaft by winding a composite material therearound; and winding the composite material around an outer surface of the main dome to form a sub dome that is bonded to the rotor, wherein any one of the main dome and the sub dome expands in a radial direction of the rotational shaft along with the rotation of the rotational shaft and the rotor to allow the sub dome and the rotor to be maintained at a bonded state there between, wherein the sub dome includes a first sub dome wound around the outer surface of the main dome and a second sub dome wound around an outer surface of the first sub dome, and the main dome, the first sub dome and the second sub dome have different winding angles from each other, and wherein the first sub dome has a winding angle smaller than that of the main dome, and the second sub dome has a winding angle smaller than that of the first sub dome.

2. The method according to claim 1, wherein the first sub dome has a winding start position different from that of the second sub dome with respect to the outer surface of the main dome.

3. The method of claim 2, wherein the winding start position of the first sub dome is close to the through hole than the winding start position of the second sub dome.

* * * * *